May 15, 1951 — O. ENGEL — 2,552,545

BEARING SURFACE RECONDITIONER

Filed Sept. 24, 1946 — 2 Sheets-Sheet 1

Inventor
Otto Engel
By C. A. Knowles
Attorneys.

Inventor
Otto Engel
By C A Snow & Co.
Attorneys

Patented May 15, 1951

2,552,545

UNITED STATES PATENT OFFICE 2,552,545

BEARING SURFACE RECONDITIONER

Otto Engel, Twin Lake, Mich., assignor to Oilock Corporation, Muskegon, Mich., a corporation of Michigan Application September 24, 1946, Serial No. 698,959

1 Claim. (Cl. 82—4)

My present invention relates to an improved bearing surface reconditioner and more especially to a tool having an adjustably mounted cutting blade so that the tool when clamped about a bearing surface will cut and recondition the bearing when the crank shaft is suitably rotated.

Conventionally the lower bearing section of the rod or main bearing as in an engine is removed, and the upper bearing section is replaced by a clamp to which is secured the tool of my invention.

By the use of this tool, labor and time may be saved in cutting back to round an egg-shaped or otherwise misshapen bearing surface.

In the accompanying drawings I have illustrated one complete example of the physical embodiment of my invention according to the best mode I have thus far devised, but it will be understood that various changes and alterations may be made in the exemplified structure within the scope of the appended claim.

Figure 1:
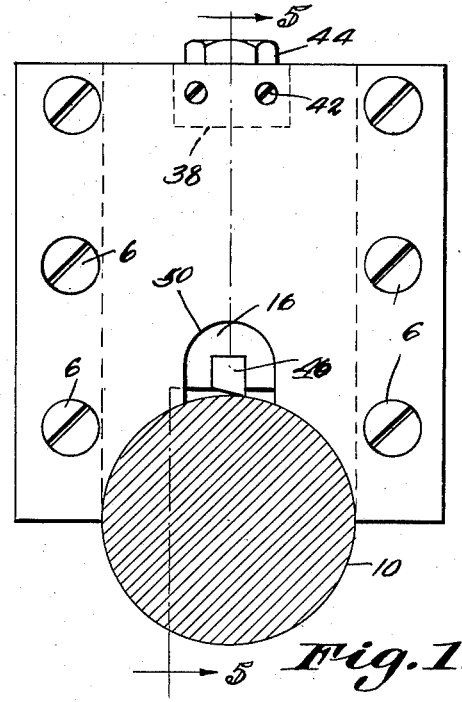
Fig. 1 is a front elevational view of the tool mounted on crankshaft in inverted position.
Figure 2:
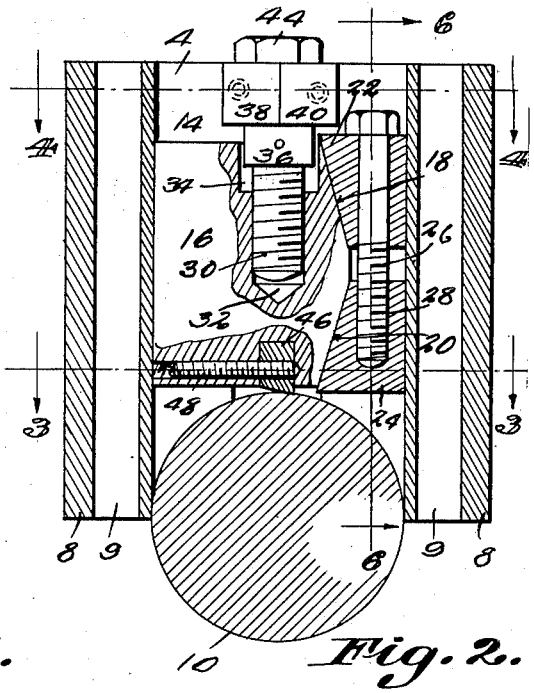
Fig. 2 is a longitudinal vertical sectional view.
Figure 3:
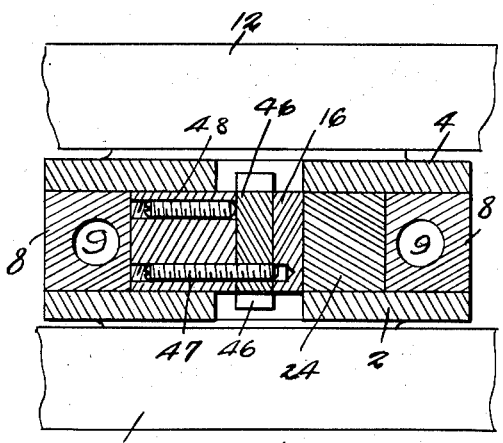
Fig. 3 is a horizontal sectional view at line 3—3 of Fig. 2.
Figure 4:
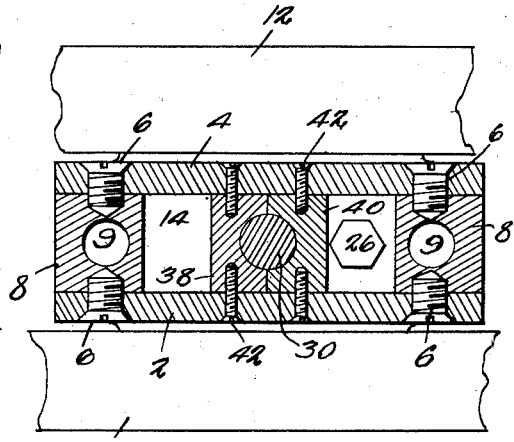
Fig. 4 is a horizontal sectional view at line 4—4 of Fig. 2.
Figure 5:
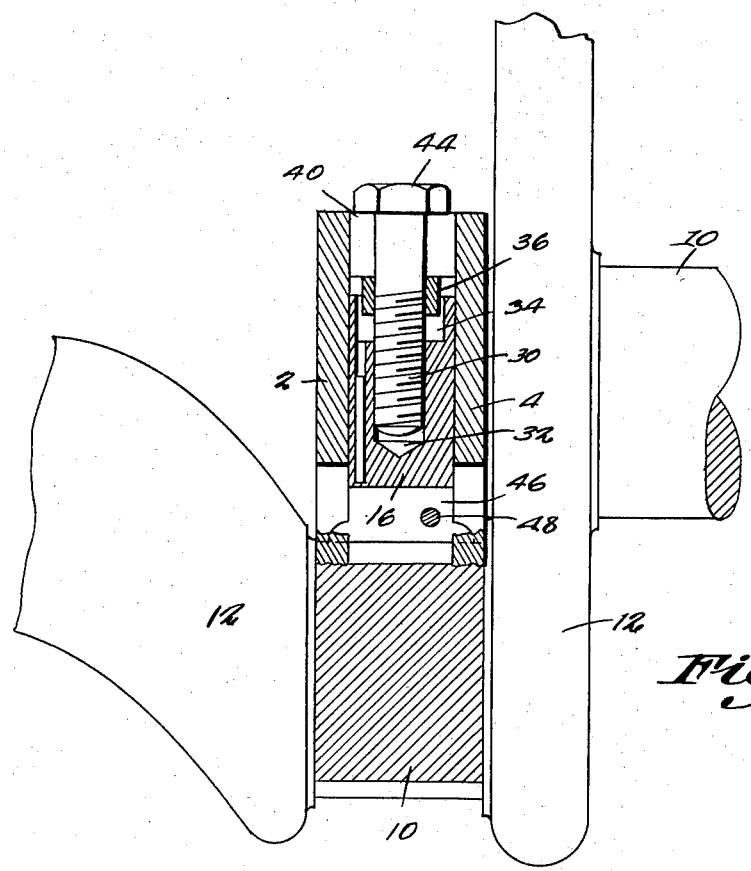
Fig. 5 is a transverse vertical sectional view at line 5—5 of Fig. 1.
Figure 6:
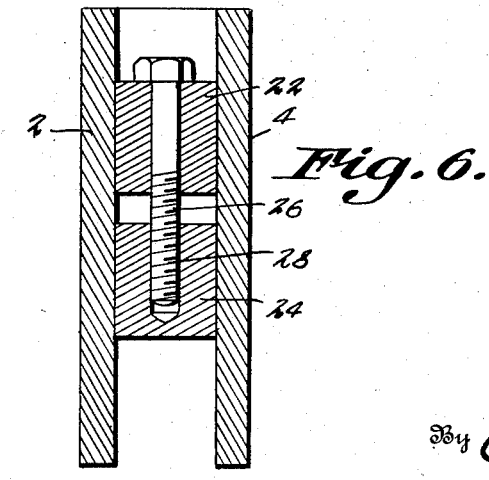
Fig. 6 is a transverse vertical sectional view at line 6—6 of Fig. 2.

Referring now to the drawings I have illustrated the preferred embodiment of my invention as comprising the front plate 2 and rear plate 4. These plates are secured by screws 6 to rectangular spacers 8 which have vertical openings or bores 9 therethrough to receive bolts, not shown, to secure the tool to a cap, not shown, making a circular enclosure for the bearing journal 10 of the crank shaft 12.

Within the chamber 14 enclosed by the plates 2 and 4, and the spacers 8, I provide a body 16 having angular, converging faces 18 and 20 for co-action with the wedges 22 and 24 secured by bolt 26 threadedly engaging the lower wedge 24 at 28. In adjustment the tightening of the bolt 26 will draw together the wedges securing the body as desired.

Vertical adjustment of the body 16 is provided through the threaded engagement of a bolt 30 in the bore 32 which has a countersunk bore 34 for the enlarged collar 36 of the bolt 30. The blocks 38 and 40 secured within the chamber 14 by screws 42 engage bolt between the collar 36 and the head and of course rotary movement of the bolt 30 by the head 44 will elevate or lower the body 16.

A cutter blade 46 is positioned in the body and secured by set screws 47 and 48 and the plates 2 and 4 are cut away at 50 so that the operation of the blade may be viewed.

The outside dimension of the plates transversely is the same as the length of the bearing surface and it being understood that in the normal operation, a bearing journal does not wear near the ends, the cutter blade is equal to the inner dimension between the plates thus turning down and reconditioning the worn surface only.

With the tool secured on the bearing surfaces, rotation of the crankshaft by hand, the tool being fixed will result in the cutting of the bearing surface to normal or round condition.

Obviously the tool may be of various sizes to fit different bearing dimensions, and the tool may be adjusted and secured as outlined above.

Having thus fully described my invention what I claim as new and desire to secure by Letters Patent is:

A bearing surface reconditioner, comprising a body having means including a pair of spaced plates having arcuate cut out portions engaging the outer unworn end portions of the bearing surface and for securing the body proximate a bearing, said plates having cut away portions extending inwardly from the edges of the arcuate shaped cut out portions of the plates, providing blade openings, a cutter blade mounted in the body disposed between the spaced plates, portions of the cutting edge of said blade extending into said blade openings cutting said bearing between the unworn end portions thereof, and means for adjusting said blade with relation to said plates.

OTTO ENGEL.

REFERENCES CITED

The following references are of record in the file of this patent:

UNITED STATES PATENTS

| Number | Name | Date |
|---|---|---|
| 1,408,358 | Kriger | Feb. 28, 1922 |
| 1,971,280 | Spencer | Aug. 21, 1934 |
| 2,154,496 | Darash | Apr. 18, 1939 |